(12) United States Patent
Verdi et al.

(10) Patent No.: US 8,908,194 B2
(45) Date of Patent: Dec. 9, 2014

(54) COMPENSATION OF MEASUREMENT ERRORS DUE TO DYNAMIC DEFORMATIONS IN A COORDINATE MEASURING MACHINE

(75) Inventors: Michele Verdi, Rivoli (IT); Giampiero Guasco, Rivalta di Torino (IT); Domenico Russo, Moncalieri (IT)

(73) Assignee: Hexagon Metrology S.p.A., Moncalleri (IT)

( * ) Notice: Subject to any disclaimer, the term of this patent is extended or adjusted under 35 U.S.C. 154(b) by 1113 days.

(21) Appl. No.: 12/666,850

(22) PCT Filed: Dec. 27, 2007

(86) PCT No.: PCT/IB2007/004109
§ 371 (c)(1),
(2), (4) Date: Dec. 15, 2010

(87) PCT Pub. No.: WO2009/001165
PCT Pub. Date: Dec. 31, 2008

(65) Prior Publication Data
US 2011/0102808 A1    May 5, 2011

(30) Foreign Application Priority Data
Jun. 28, 2007    (WO) .................. PCT/IT2007/000465

(51) Int. Cl.
*G01B 11/14*    (2006.01)
*G01B 21/04*    (2006.01)
*G01B 5/008*    (2006.01)

(52) U.S. Cl.
CPC .............. *G01B 21/045* (2013.01); *G01B 5/008* (2013.01)
USPC ........................................................ 356/614

(58) Field of Classification Search
CPC ............................... G01B 21/045; G01B 5/008
USPC .......................................................... 356/614
See application file for complete search history.

(56) References Cited

U.S. PATENT DOCUMENTS 4,453,085 A  *  6/1984  Pryor .......................... 250/203.1
4,647,206 A       3/1987  Kunzmann et al.
(Continued)

FOREIGN PATENT DOCUMENTS

DE    3729161       3/1989
DE    3833680 A1    5/1990
(Continued)

OTHER PUBLICATIONS

Patent Cooperation Treaty PCT International Search Report, Dec. 27, 2007, PCT/IB2007/004109.
(Continued)

*Primary Examiner* — Michael A Lyons
*Assistant Examiner* — Shawn Decenzo
(74) *Attorney, Agent, or Firm* — FSP LLC

(57) ABSTRACT

A measuring machine includes a mobile unit to move a measurement sensor in a measurement volume. The mobile unit includes at least one member mobile along an axis under the thrust of driving means and being subjected to dynamic deformations. A laser sensor is provided with a laser emitter fixed to a first portion of the mobile member and a target fixed to a second portion of the mobile member and designed to receive a laser beam generated by the emitter. Means are provided for compensating for measurement errors of the machine resulting from the dynamic deformations of the mobile unit and in response to displacement of a point of incidence of the laser beam on the target with respect to a reference position in undeformed conditions, the displacement of the point resulting from the relative displacement of the first and second portions of the mobile member.

12 Claims, 9 Drawing Sheets

(56) References Cited

U.S. PATENT DOCUMENTS

| | | | |
|---|---|---|---|
| 4,939,678 | A | 7/1990 | Beckwith, Jr. |
| 5,042,162 | A * | 8/1991 | Helms ........................... 33/503 |
| 7,395,606 | B2 * | 7/2008 | Crampton ........................ 33/503 |
| 2005/0102118 | A1 | 5/2005 | Grupp et al. |
| 2005/0166413 | A1 | 8/2005 | Crampton |

FOREIGN PATENT DOCUMENTS

| | | |
|---|---|---|
| DE | 3936465 A1 | 8/1991 |
| JP | 6313710 | 11/1994 |
| JP | 8247756 | 9/1996 |

OTHER PUBLICATIONS

Notice of Opposition for EPO Application No. 07859192.2, mailed on Jun. 16, 2011.

PCT, International Search Report for application PCT/IB2007/004109, mailed on May 26, 2008.

Office Action for Japanese Patent Application No. JP2010-514154 mailed on Dec. 4, 2012.

Taiwan Office Action, application serial No. TW200912249.

* cited by examiner

COMPENSATION OF MEASUREMENT ERRORS DUE TO DYNAMIC DEFORMATIONS IN A COORDINATE MEASURING MACHINE

PRIORITY

This application claims priority under 35 U.S.C. 365 AND/OR 35 U.S.C. 119 to PCT application no. PCT/IB2007/004109 filed on Dec. 27, 2007.

TECHNICAL FIELD

The present invention relates to a co-ordinate measuring machine and to a method for compensation of the measurement errors due to dynamic deformations.

STATE OF THE PRIOR ART

As is known, co-ordinate measuring machines generally comprise three carriages mobile along the co-ordinate axes of a cartesian reference system and designed to move a measurement sensor in a measurement volume. The machine is designed to output the co-ordinates of a piece detected by the measurement sensor, calculated as a function of the position of the carriages along the respective axes.

More in particular, co-ordinate measuring machines comprise: a base structure provided with guides along a first axis, for example, a bed made of granite or other material or else a pillar structure; a first carriage, which is mobile on the base structure along the first axis; a second carriage, which is carried by the first carriage and is mobile along a second axis orthogonal to the first axis; and a third carriage, which is carried by the second carriage and is mobile with respect to this along a third axis orthogonal to the first two axes. The measurement sensor is carried by the third carriage.

The first axis is generally horizontal; according to the kind of machine, the second axis can be horizontal and the third axis vertical, or vice versa.

For example, in machines of the bridge or gantry type, the first carriage comprises a horizontal cross member defining the second axis on which the second carriage slides, and the third carriage is constituted by a column, which is carried by the second carriage and is vertically mobile.

In machines of the horizontal arm type, instead, the first carriage comprises a vertical column defining the second axis, along which the second carriage slides, and the third carriage is constituted by a horizontal arm, which is carried by the second carriage and is horizontally mobile.

For displacement of the carriages electric motors are used, which transmit actuation forces to the carriages via appropriate mechanisms or, alternatively, linear electric motors fixed with respect to the carriages.

The accelerations necessary for carrying out the measurement cycles in increasingly shorter times requires high actuation forces, such as to induce elastic deformations of the mobile parts of the machine on account of the dynamic (inertial) effect. Said deformations, which are also due to the lightened structure of the moving parts, can be significant for the measurement precision.

In order to guarantee the class of precision of the measuring machine, the measurement error caused by the elastic deformation must be estimated and then compensated for.

OBJECT OF THE INVENTION

The aim of the present invention is to provide a measuring machine that will enable accurate estimation of the measurement errors due to the dynamic deformations, as well as a method for compensation of the aforesaid errors.

BRIEF DESCRIPTION OF THE DRAWINGS

For a better understanding of the invention, described in what follows are some preferred embodiments, provided by way of non-limiting examples and with reference to the attached drawings, wherein.

PREFERRED EMBODIMENT OF THE INVENTION

Figure 1:
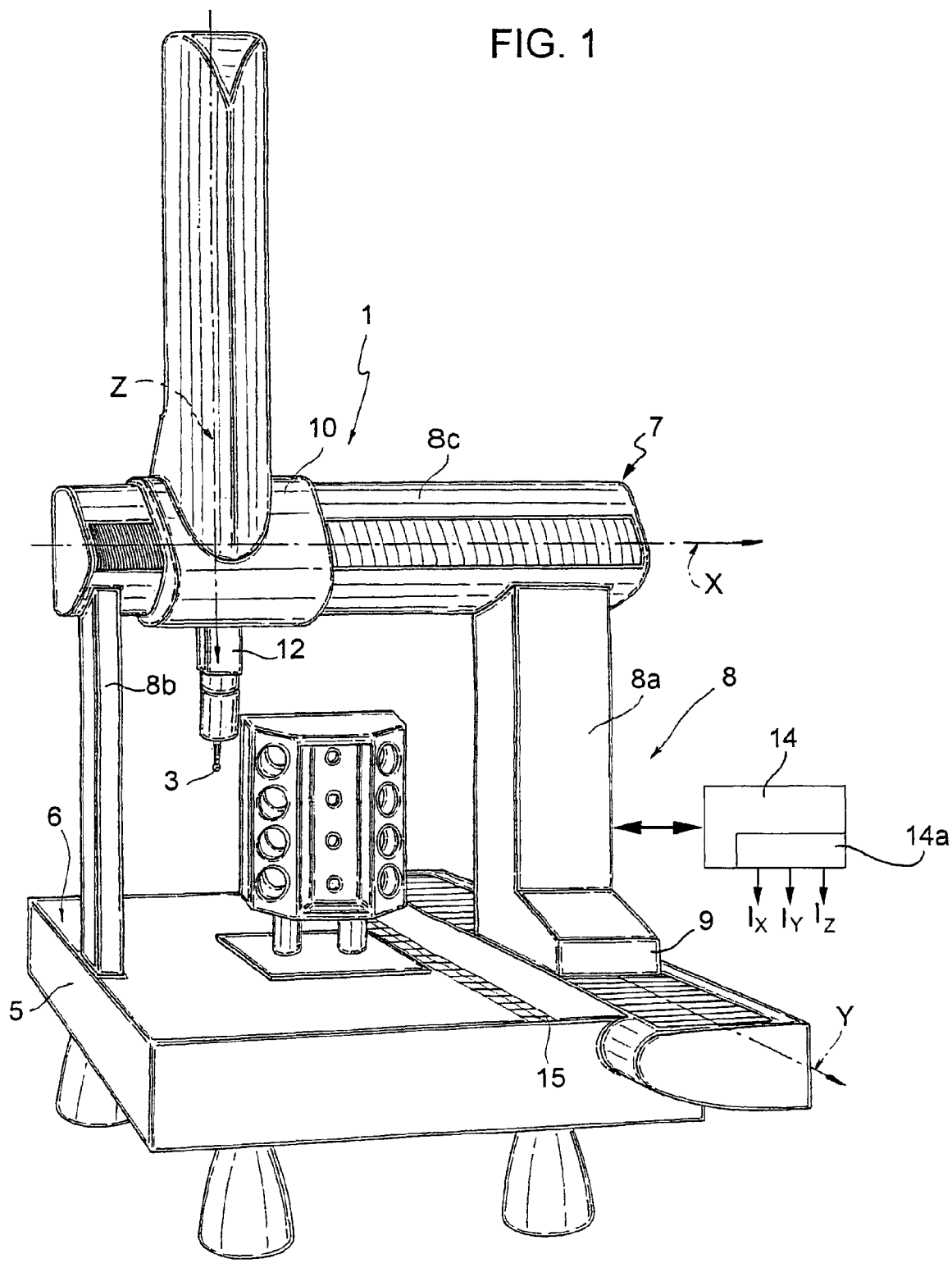
FIG. 1 illustrates a bridge measuring machine according to the present invention.

In the first embodiment described, the measuring machine 1 is of the bridge type and comprises a bed 5 provided with a horizontal plane top surface 6 or reference surface and a mobile unit 7.

The mobile unit 7 comprises a motor-driven carriage 8, which slides on the bed 5 along a first horizontal axis (axis Y) of a cartesian reference system X, Y, Z of the measurement volume.

The carriage 8 has a bridge structure and comprises two vertical uprights 8a, 8b and a top horizontal cross member 8c that extends between the top ends of the vertical uprights 8a, 8b.

The upright 8a comprises at its bottom end a motor-driven slide 9, which is slidable on guides 11 parallel to the axis Y and obtained, in a known way, in the proximity of a longitudinal edge of the bed 5.

The cross member 8c carries a slide 10 that slides on guides (not illustrated) along an axis parallel to a second axis (axis X) of the reference system.

Mounted on the slide 10 is a vertical column 12, mobile along a third axis (axis Z) of the reference system. The vertical column 12 carries at its bottom end a measurement sensor 3 (of a known type).

The carriage 8, the slide 10 and the column 12 are provided with respective motors 13, for example linear motors (only one of which is visible in FIG. 2), which control displacement thereof along the respective co-ordinate axes.

The measuring machine 1 is controlled by a control unit 14 provided with a power section 14a, which supplies the supply currents $I_Y$, $I_X$, $I_Z$ to the electric motors of the respective carriages 8, 10, 12 for displacement of the measurement sensor 3 along the axes Y, X and Z and hence its positioning in the measurement volume.

The measuring machine 1 outputs—through a software based upon algorithms of a known type—the position xa, ya, za of the measurement sensor 3 in the measurement volume by detecting the position of the slides along the respective axes X, Y and Z.

In the operating conditions described above, the position of the measurement sensor 3 is affected by a position error ex, ey, ez of a dynamic type with respect to the measured values xa, ya, za, due to the fact that the mechanical structure of the mobile unit 7 that carries the measurement sensor 3 (principally the vertical upright 8a, the cross member 8c, and the area of connection between the top end of the upright 8a and the cross member 8c) deforms elastically on account of the forces impressed by the electric motors driving the slides 8 and 10.

Figure 3:
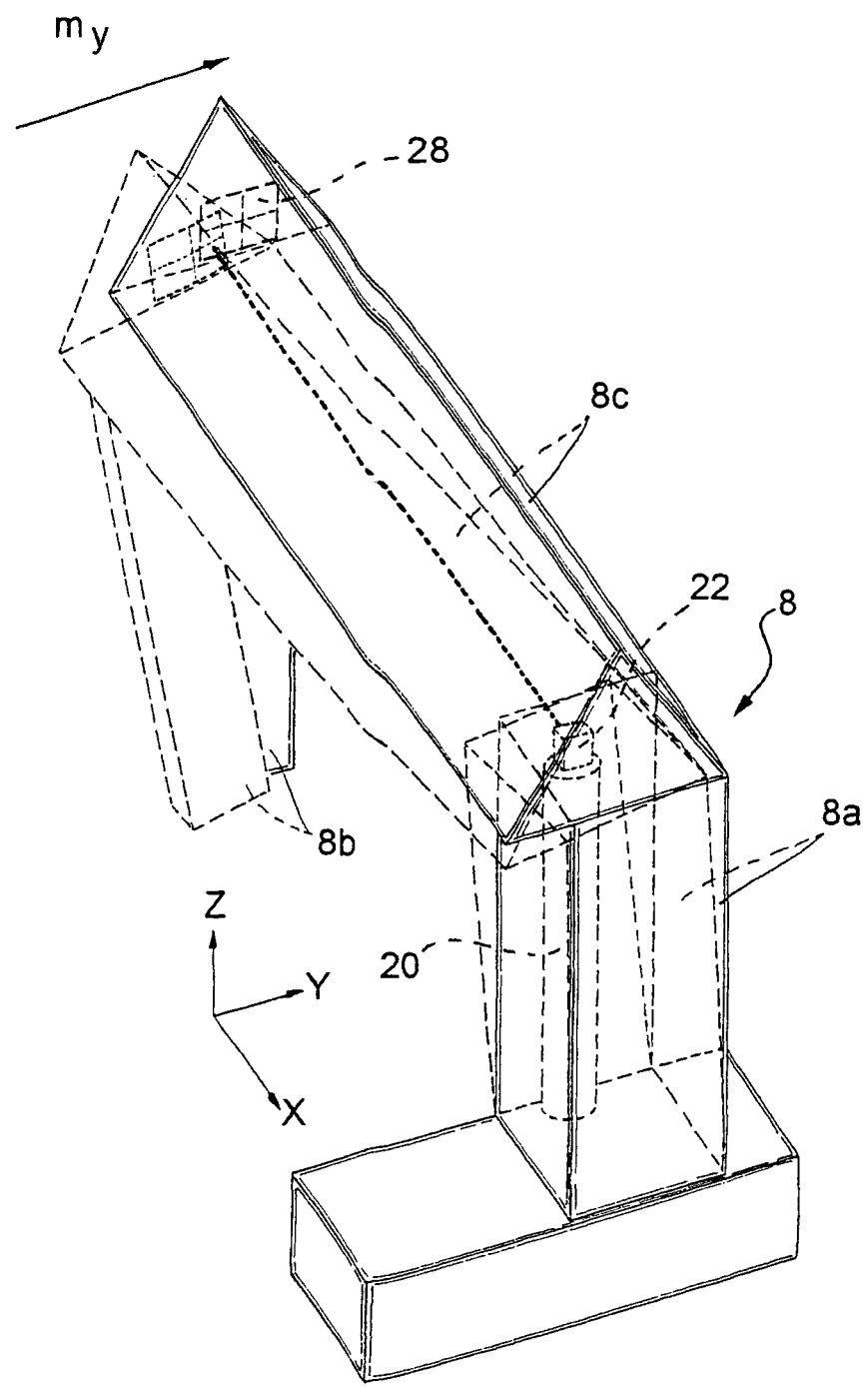
FIG. 3 is a schematic perspective view of a carriage of the machine of FIG. 1, in a first mode of dynamic deformation.
Figure 4:
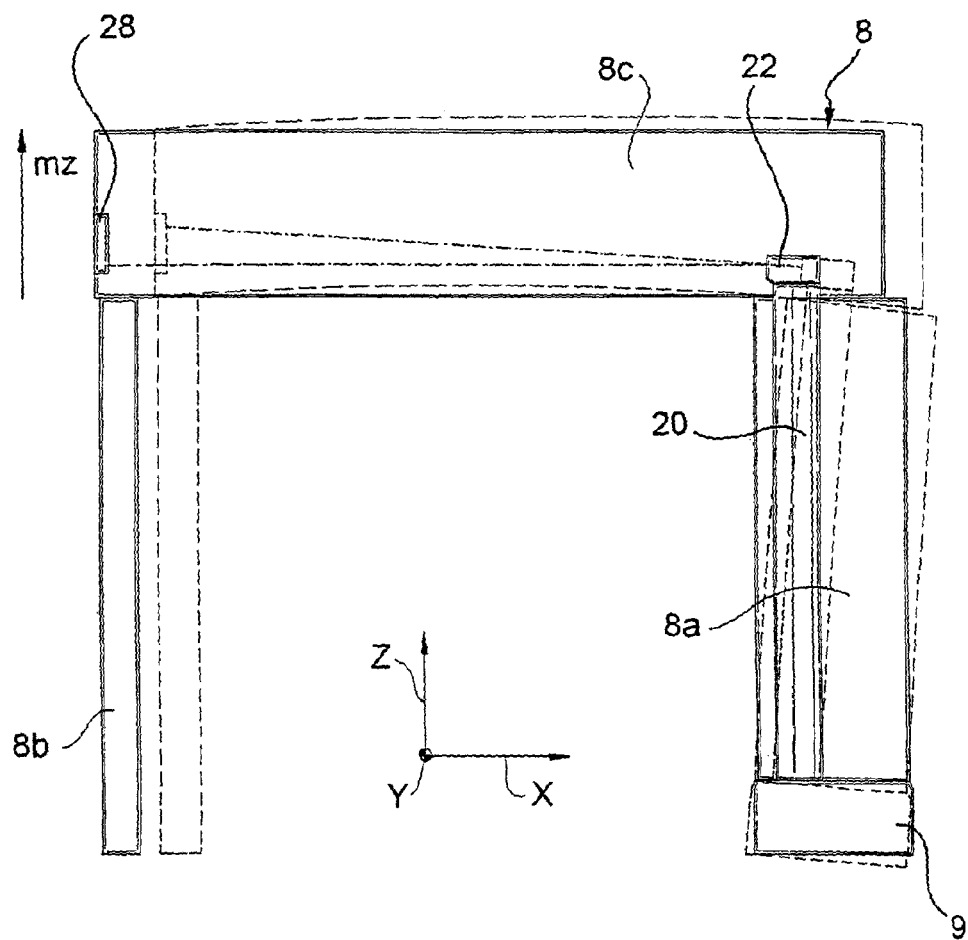
FIG. 4 is a schematic front view of the carriage of FIG. 3, in a second mode of dynamic deformation.

The deformation of the mobile unit 7 of the measuring machine 1 is exemplified with reference to FIGS. 3 and 4.

FIG. 3 illustrates the deformations caused by the displacement of the carriage 8 along the axis Y. Said deformations mainly comprise:
 bending of the upright 8a;
 bending of the cross member 8c;
 torsion of the upright 8a about the axis Z; and
 torsion of the cross member 8c about the axis X.

FIG. 4 illustrates, instead, the deformations caused by the displacement of the slide 10 along axis X.

Said deformations mainly comprise:
 a deformation of the joint between the upright 8a and the cross member 8c;
 bending of the cross member 8c;
 rotation of the upright 8a about the axis Y; and
 a translation of the cross member 8c along the axis X.

In the calibration step (identification of the dynamic model), the position error ex, ey along the axes Y and X is measured directly by mounting on the reference surface 6 a two-dimensional position transducer 15 (of a known type) not subjected to the deformations of the moving parts of the machine, and by measuring the difference (i.e., the position error ex, ey) between the position xg, yg of the head of the measurement sensor 3 obtained on the two-dimensional position transducer 15 and the position (xa and ya) as detected by the machine, i.e., ex=xg−xa, ey=yg−ya. The position error ez is negligible.

For example, the functions of the two-dimensional position transducer 15 can be provided by the comparison system VM 182 produced by the company HEIDENHAIN used for calibration of the machines.

Moreover installed on the measuring machine 1 is a laser sensor 16, which supplies an information on the dynamic deformations that the mobile unit 7 undergoes during the movements of the carriage 8 and of the slide 10 (as regards the deformations see what is said with reference to FIGS. 3 and 4).

Figure 2:
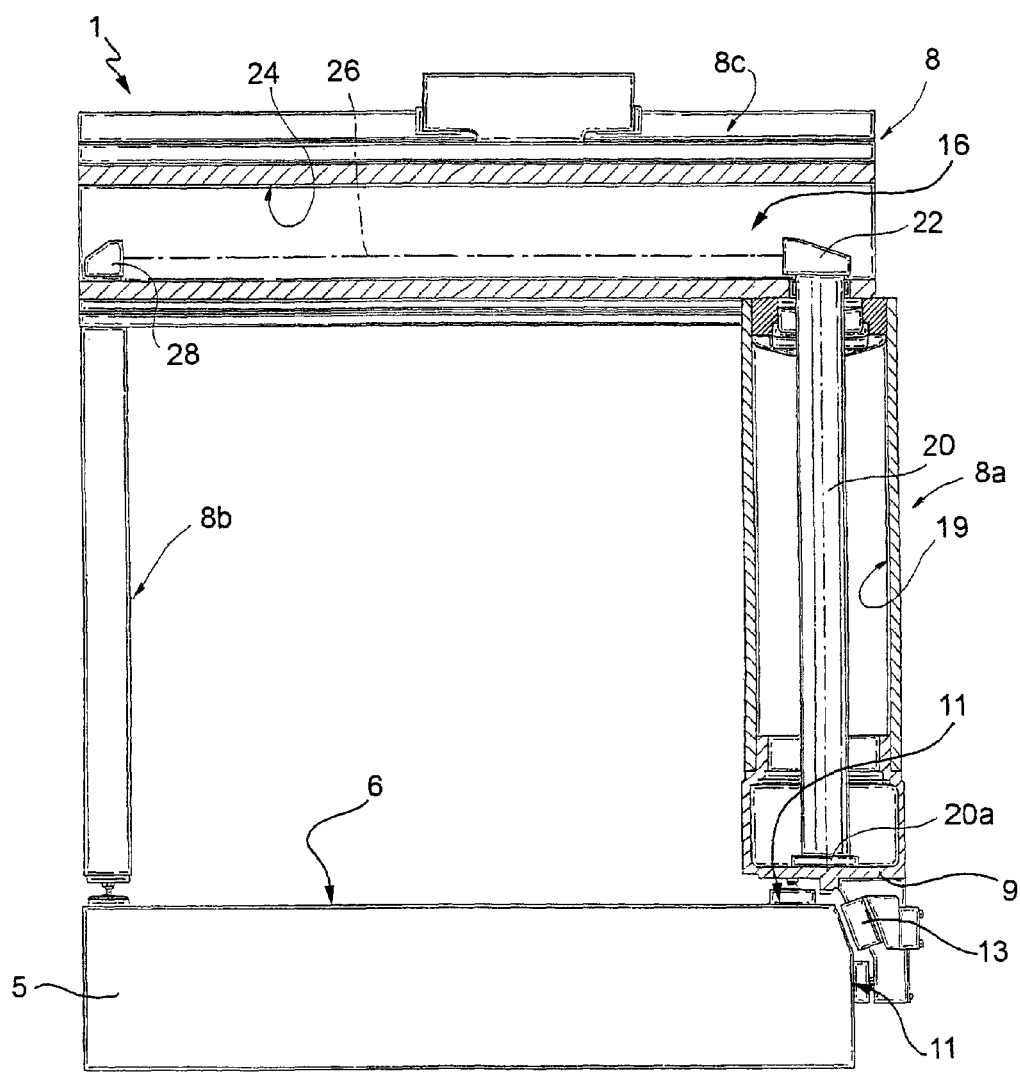
FIG. 2 is a front view in partial cross section of the machine of FIG. 1.

With particular reference to FIG. 2, the laser sensor 16 is housed in a longitudinal cavity 24 of the cross member 8c and comprises a laser emitter 22 set at one end of the cavity 24 and a target 28 set at the opposite end of the cavity 24. The emitter 22 emits a laser beam 26 that traverses the cavity 24 parallel to the axis X and strikes the target 28.

Conveniently, the emitter 22 is carried by a vertical bar 20, which is as rigid as possible, which extends within a vertical cavity 19 of the upright 8a and has a first bottom end 20a rigidly fixed to the slide 9 (and hence not affected by the deformations of the vertical upright 8a) and a second top end that comes out of the upright 8a in the cavity 24 of the cross member 8c, fixed on which is the laser-emitter device 22.

The target 28 is constituted by a PSD (Position-Sensitive Device, of a known type), which detects displacements of the point of incidence of the laser beam 26 along two axes parallel to the axes Y and Z of the reference system, as a function of the deformation of the mechanical structure, with respect to a reference position corresponding to an undeformed condition.

The displacements my, mz of the laser beam detected on the target 28 along the axes Y and Z, together with other information, make it possible to trace back (for example, by means of the techniques described hereinafter) to the dynamic deformations undergone by the mechanical structure as a result of the movement of the axes Y and X.

Figure 5:
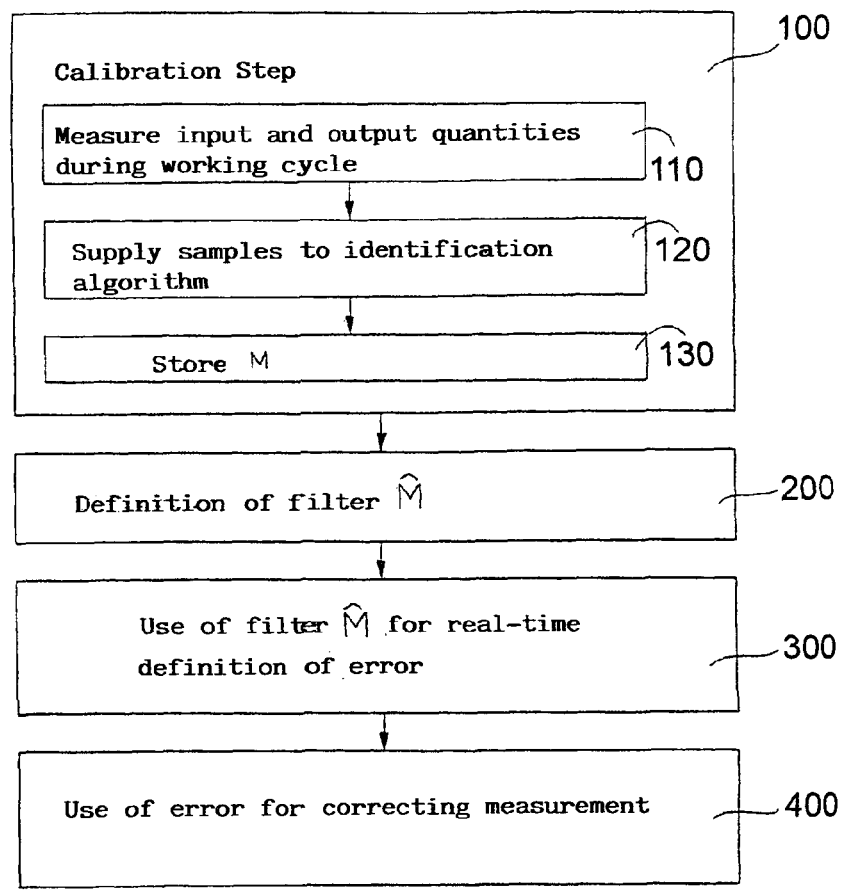
FIG. 5 is a block diagram of a method for compensation of the dynamic deformations that can be used in a measuring machine according to the present invention.

In an initial calibration step (block 100, FIG. 5), an input-output model M is defined, which describes the dynamic behaviour of the measuring machine 1 (said step is also defined as model-identification step).

Figure 6:
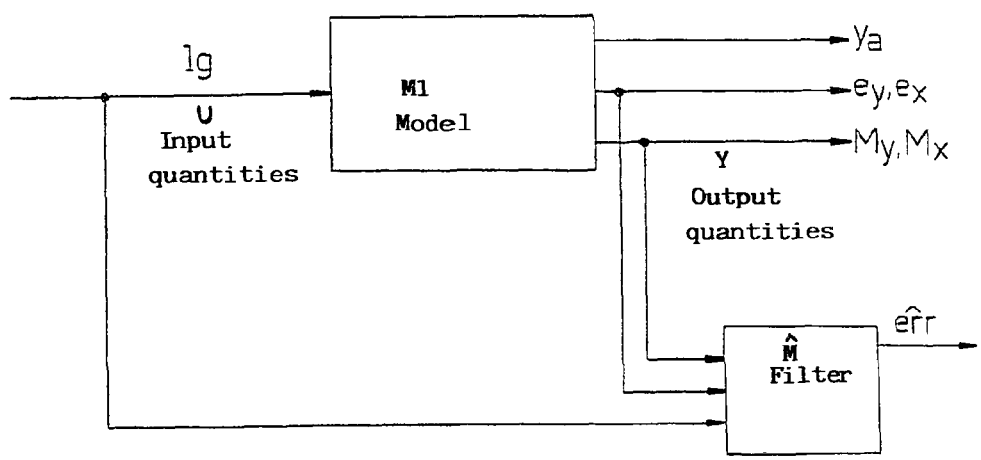
FIG. 6 is a block diagram of a model for implementation of the method.

In particular, the input-output model M (FIG. 6) is multi-variable and receives at input (u) the supply currents of the two motors for controlling the respective displacements along the axes X and Y (it has been preliminarily verified that the dynamics due to the displacements of the slide along the axis Z leads to negligible errors), and outputs (y) a plurality of quantities that comprise the position ya, xa of the measurement sensor 3 obtained from the axes of the machine, the position errors ey, ex introduced by the elasticity of the machine 1 along the axes X and Y measured by means of the two-dimensional position transducer 14, and the deformations my, mz of the machine measured by the laser sensor 16.

On account of the linearity of the phenomenon for small perturbations, the entire model is broken down into two models:
 a first model M1, which receives at input the current Iy of the motor of the axis Y and outputs the position ya along the axis Y, as well as position errors ey, ex and measurements of deformation my, mz along the axes Y and Z; and
 a second model M2, altogether equivalent to the model M1, which receives at input the current 1x of the motor of the axis X, and outputs the position xa along the axis X, as well as the position errors ey, ex and the measurements of deformation my, mz along the axes Y and Z.

In fact, to a stress along one of the axes there corresponds a main error component along the same axis and a secondary component (due to the mechanical couplings) along the orthogonal axis. The overall error of the machine results from the superposition of the effects of the error components given by the two models (this part will be clarified hereinafter).

Described in what follows is the definition of the first model M1 with respect to one of the axes (the axis Y) in so far as the method of definition of the second model M2 with respect to the other axis (axis X) is altogether equivalent.

The model M1 has as input quantity u the current Iy. The output quantities y are:
 the position ya along the axis Y supplied by the machine 1;
 the deformations my, mz along the axes Y and Z measured by the laser sensor 16; and
 the position error ey, ex along the axes Y and X measured by the two-dimensional position transducer 15.

The differential equations that characterize the model M1 are:

$$x = Ax + Bu + K\epsilon$$

$$y = Cx + Du + \epsilon$$

where
u is the measured input (the current Iy to the motor), y the output quantities, x the state variables of the dynamics, and $\epsilon$ the innovation process resulting from the identification. Finally, A, B, C, D and K are the matrices of the model. In particular, $$u = [Iy]$$

$$y = \begin{bmatrix} ya \\ my \\ mz \\ ex \\ ey \end{bmatrix}$$

$$A = \begin{bmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \\ a_{41} & a_{42} & a_{43} & a_{44} & a_{45} & a_{46} \\ a_{51} & a_{52} & a_{53} & a_{54} & a_{55} & a_{56} \\ a_{61} & a_{62} & a_{63} & a_{64} & a_{65} & a_{66} \end{bmatrix} \quad B = \begin{bmatrix} b_{11} \\ b_{21} \\ b_{31} \\ b_{41} \\ b_{51} \\ b_{61} \end{bmatrix}$$

$$C = \begin{bmatrix} c_{11} & c_{12} & c_{13} & c_{14} & c_{15} & c_{16} \\ c_{21} & c_{22} & c_{23} & c_{24} & c_{25} & c_{26} \\ c_{31} & c_{32} & c_{33} & c_{34} & c_{35} & c_{36} \\ c_{41} & c_{42} & c_{43} & c_{44} & c_{45} & c_{46} \\ c_{51} & c_{52} & c_{53} & c_{54} & c_{55} & c_{56} \end{bmatrix} \quad D = \begin{bmatrix} d_{11} \\ d_{21} \\ d_{31} \\ d_{41} \\ d_{51} \end{bmatrix}$$

$$K = \begin{bmatrix} k_{11} & k_{12} & k_{13} & k_{14} & k_{15} & k_{16} \\ k_{21} & k_{22} & k_{23} & k_{24} & k_{25} & k_{26} \\ k_{31} & k_{32} & k_{33} & k_{34} & k_{35} & k_{36} \\ k_{41} & k_{42} & k_{43} & k_{44} & k_{45} & k_{46} \\ k_{51} & k_{52} & k_{53} & k_{54} & k_{55} & k_{56} \\ k_{61} & k_{62} & k_{63} & k_{64} & k_{65} & k_{66} \end{bmatrix}$$

As regards the definition of the innovation process, reference may be made to the text by Lennart Ljung entitled "System Identification—Theory for the user", Prentice-Hall; Upper Saddle River, N.J., 1999.

The input quantities u and output quantities y are measured and registered during a series of working cycles (block 110) in which the carriage 8 is made to translate along the axis Y, by subjecting the machine 1 to an acceleration that causes deformation of the machine itself as a result of the dynamic effect. Then, the dynamic input-output model M1 that describes the elastic behaviour of the machine is identified, by setting in relation the input quantities u with the output quantities y.

Figure 7:
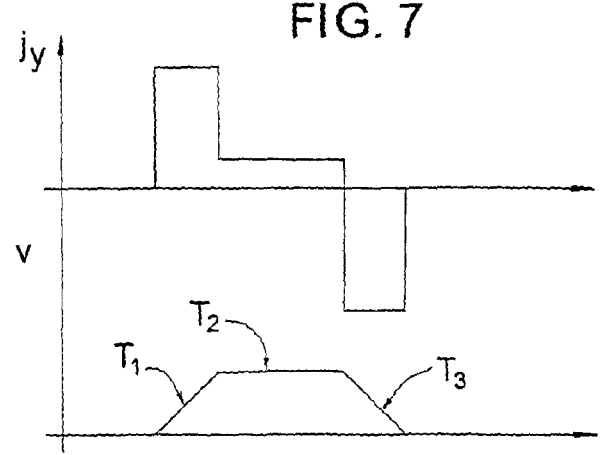
FIG. 7 shows the time plots of physical quantities correlated with a movement cycle of the carriage of FIG. 3.

The carriage 8 of the axis Y is made to perform, with a closed-loop control, a displacement, starting from a stationary condition, with a law of motion that envisages (FIG. 7) a first acceleration step to which there corresponds a speed ramp T1, a second step at constant speed, a third deceleration step T3, until it stops again. Corresponding to this law of motion is a current cycle characterized by a positive step during acceleration, a reduced value during motion at constant speed and a negative step during deceleration.

During the calibration step, the input quantities u and output quantities y are sampled, with a sampling period of 500 μs and stored.

The samples of the input and output quantities are supplied to an identification algorithm, which, with a maximum-likelihood approach applied to a linear innovation model characterized by a quintuple of matrices A, B, C, D, K, identifies the input-output model M1 as described by the system of differential equations given above (for the definition of the maximum-likelihood algorithm reference may be made to the text by Lennart Ljung entitled "System Identification—Theory for the user", Prentice-Hall; Upper Saddle River, N.J., 1999).

To be precise, the model is not constant throughout the measurement volume of the machine, so that different calibration steps are carried out similar to the one described above to cover the entire measurement volume.

The variability of the model regards the axes X and Z, so that the measurement volume has been divided into a plurality of sections (for example nine sections: bottom-left, bottom-centre, bottom-right, centre-left, . . . ) in which respective models M1a, M1b, M1c, . . . , M1n have been defined.

An overall model M1compl has then been defined that approximates the various models M1a, M1b, M1c, . . . , M1n in the measurement volume.

In particular, it has been noted how the matrices A, B, D and K of the various models are substantially constant throughout the measurement volume, whilst only part of the matrix C changes in the measurement volume.

The overall model M1compl consequently comprises the matrices A, B, D and K that do not vary in the measurement volume and a matrix C having a portion (the rows corresponding to the error signals ex, ey) with variable parameters, which is a function of the co-ordinates of the axes X and Z and hence varies in the measurement volume:

$$C = C(xa, za)$$

Said function $C = C(xa, za)$ is non-linear with respect to the axes X and Z and is obtained by interpolating the matrices C of the various models M1a, M1b, M1c, . . . , M1n in the different sections of the measurement volume using b-spline functions (as regards the definition of the spline functions see the text by M. Broen, C. Harris entitled "NeuroFuzzy Adaptive Modelling and Control", Prentice-Hall International (UK) Limited, 1994).

At the end of the calibration step, the two-dimensional position transducer 15 is removed.

Following upon the definition of the overall model M1compl that represents the "signature" of the particular machine undergoing calibration, the step 100 is then followed by a step 200 in which, starting from the overall model M1compl, an estimator filter 1 is designed.

For this design step the model M1compl is represented (in the time domain, a similar representation being possible in a discrete manner) in the following form:

$$x = Ax + Bu + K\varepsilon$$
$$y = C1x + D1u$$
$$z = C2x + D2u$$

where:

$$u = [Iy]$$

-continued $$y = \begin{bmatrix} ya \\ my \\ mz \end{bmatrix}$$

$$z = \begin{bmatrix} ex \\ ey \end{bmatrix}$$

$$A = \begin{bmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \\ a_{41} & a_{42} & a_{43} & a_{44} & a_{45} & a_{46} \\ a_{51} & a_{52} & a_{53} & a_{54} & a_{55} & a_{56} \\ a_{61} & a_{62} & a_{63} & a_{64} & a_{65} & a_{66} \end{bmatrix} \quad B = \begin{bmatrix} b_{11} \\ b_{21} \\ b_{31} \\ b_{41} \\ b_{51} \\ b_{61} \end{bmatrix}$$

$$C1 = \begin{bmatrix} c_{11} & c_{12} & c_{13} & c_{14} & c_{15} & c_{16} \\ c_{21} & c_{22} & c_{23} & c_{24} & c_{25} & c_{26} \\ c_{31} & c_{32} & c_{33} & c_{34} & c_{35} & c_{36} \end{bmatrix} \quad D1 = \begin{bmatrix} d_{11} \\ d_{21} \\ d_{31} \end{bmatrix}$$

$$C2 = \begin{bmatrix} c_{41} & c_{42} & c_{43} & c_{44} & c_{45} & c_{46} \\ c_{51} & c_{52} & c_{53} & c_{54} & c_{55} & c_{56} \end{bmatrix} \quad D2 = \begin{bmatrix} d_{41} \\ d_{51} \end{bmatrix}$$

Highlighted among the outputs are the measured ones (distinguished by the symbol y in the system illustrated above) and the non-measured ones, which are to be estimated (distinguished by the symbol z in the system illustrated above).

The matrix C1 comprises the first three rows of the matrix C, and the matrix C2 the last two rows of the matrix C. Likewise, the matrix D1 comprises the first three rows of the matrix D, and the matrix D2 the last two rows of the matrix D.

As regards the variability in the measurement volume, according to this new representation of the model, only the matrix C2 is actually a function of the position of the axes X and Z, whilst all the other matrices are constant:

$$C2 = C2(xa, za)$$

The estimator filter 1 is designed by applying analytical techniques of robust filtering (in this connection, see the text by P. Colaneri, A. Locatelli, J. C. Jeromel entitled "Control theory and design, a RH2-RH-inf viewpoint", Academic Press, 1997) on the basis of the overall model M1compl identified previously.

An effective technique that enables improving the precision of the estimator consists in accepting that said filter will supply an estimation delayed in time (interpolation). This technique is described, for example, in the article by P. Bolzerem, P. Colaneri, and G. De Nicolao entitled "Discrete-Time H-Infinity fixed lag smoothing" IEEE Trans. On Signal Processing, Vol. 52, n. 1, pp. 132-141, 2004.

In other words, at the time instant (t) the estimator makes available the estimate of the dynamic deformations corresponding to the instant (t-Delta). Delta is a time delay that is sufficiently short as not to jeopardize the efficiency of the machine in making promptly available the measurements performed, but is sufficiently long as to improve the precision of the estimation. Practically, it has been found that a value of Delta equal to a few hundredths of a second is convenient.

The estimator filter $\hat{M}1$ supplies an estimate of the error in response to measured values of the input u and of the output quantities y (measurements ya along the axis Y and values of deformation my, mz).

The estimator filter $\hat{M}1$ is represented by the equations:

$$\dot{\hat{x}} = \hat{A}\hat{x} + Bu + \hat{K}y$$

$$\hat{z} = C2(xa, za)\hat{x} + D2u$$

where y is the vector of the outputs measured by the machine and u is the vector of the inputs, and where the matrices $\hat{A}, \hat{K}$ are the result of the design of the estimator starting from the matrices A, B, K, C1, D1, according to the robust-filtering techniques referred to above.

In this way, the estimator filter $\hat{M}1$ outputs an estimation of the error of a dynamic type.

The matrices of the estimator filter $\hat{M}1$ of a linear type, following upon their definition, are stored and integrated in the measurement software of the machine for the estimation of the unknown error (block 400).

The operations illustrated above are repeated for the current of the axis X in order to define an estimator filter $\hat{M}2$. The results coming from the filters $\hat{M}1$ and $\hat{M}2$ are summed up together as a result of the superposition of the effects.

The method described above is a non-limiting example of how the measurements my, mz can be used analytically for estimating the dynamic behaviour of the machine. It is of course possible to use any other analytical method suitable for the purpose.

FIGS. 8 to 11 illustrate various embodiments of measuring machines, or parts thereof, which use laser sensors for the estimation of the deformations of a dynamic type.

Figure 8:
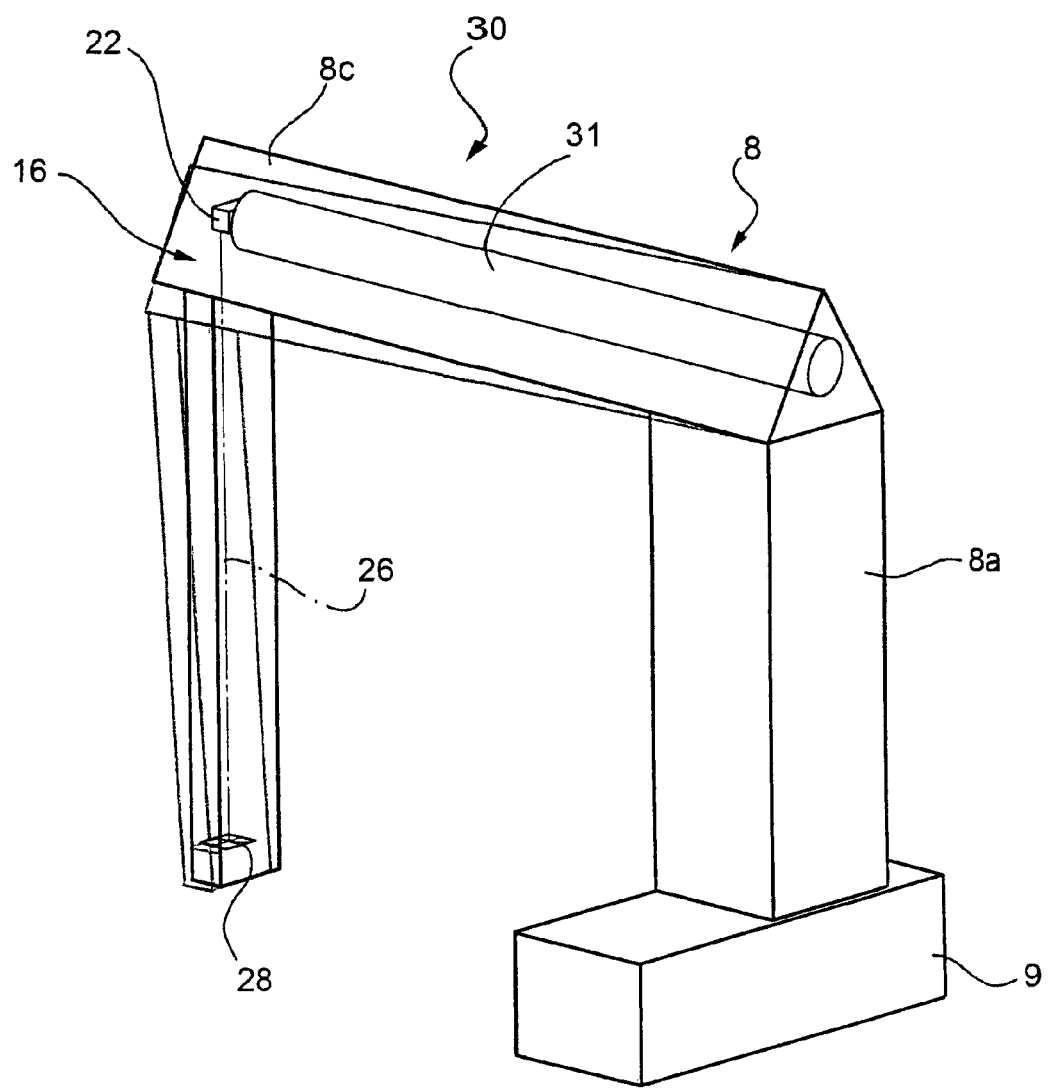
FIG. 8 is a schematic perspective view of the carriage of the measuring machine of FIG. 1, according to a different embodiment of the invention.

FIG. 8 illustrates a bridge machine 30 similar to that of FIG. 1, in which, however, the laser sensor 16 is used for obtaining measurements mx, my correlated to other components of deformation of the machine.

More in particular, the laser emitter 22 is carried by a horizontal bar 31, which is housed inside the cavity 24 of the cross member 8c and has one end rigidly fixed to the top end of the upright 8a of the carriage 8 and an opposite end bearing the laser emitter 22. The emitter 22 emits a laser beam 26 downwards. The beam 26 traverses a vertical cavity of the upright 8b of the carriage 8 and strikes a PSD 28 set in the foot of the upright 8b.

This type of configuration enables specific detection of torsion of the cross member about the axis X and bending of the cross member 8c in the plane XY, following upon which the PSD 28 measures misalignment values mx, my of the laser beam 26 with respect to an undeformed position.

Figure 9:
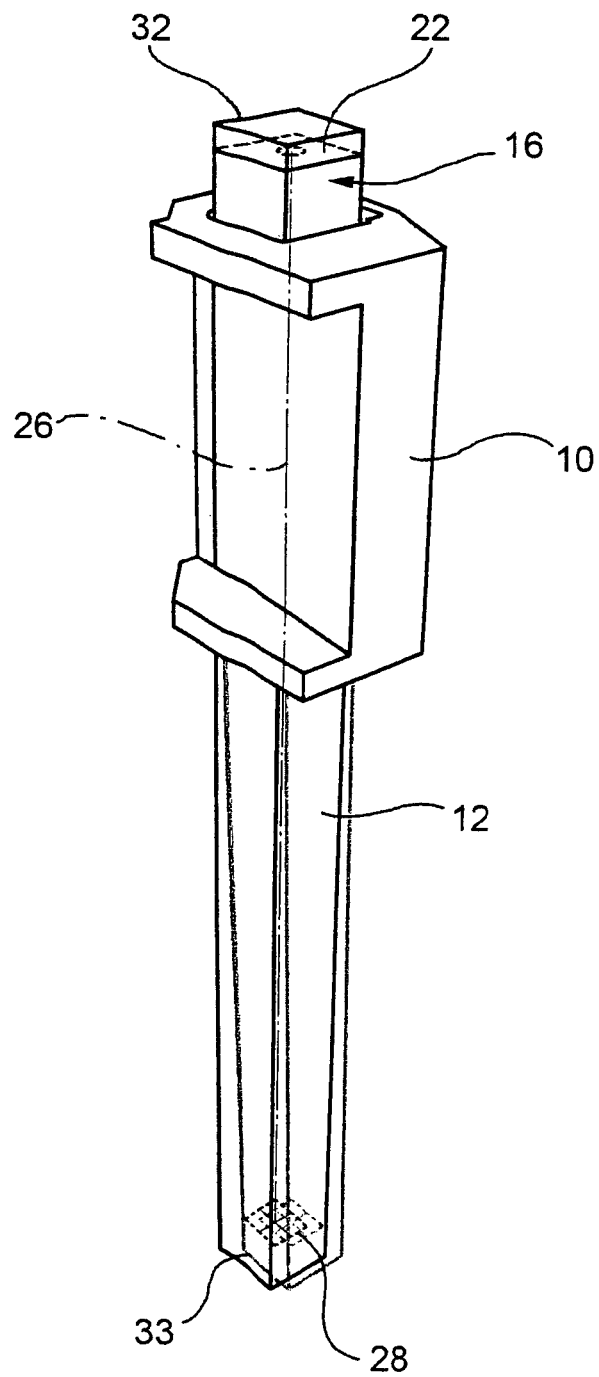
FIG. 9 is a schematic perspective view of a column of the machine of FIG. 1, according to a variant embodiment of the present invention.

FIG. 9 illustrates another embodiment in which a laser sensor 16 is installed inside the column 12, with the emitter 22 fixed with respect to a rigid support 32, which is fixed to the top end of the column itself, and with the PSD 28 fixed to the bottom end 33. Consequently, this configuration detects dynamic bending of the column 12 in the directions X and Y.

The systems of FIGS. 8 and 9 can be combined to one another and/or to that of FIG. 2 in such a way as to have available a higher number of measurable output quantities of the model and consequently estimate the effective deformations of a dynamic type of the mobile unit 7 more accurately.

Figure 10:
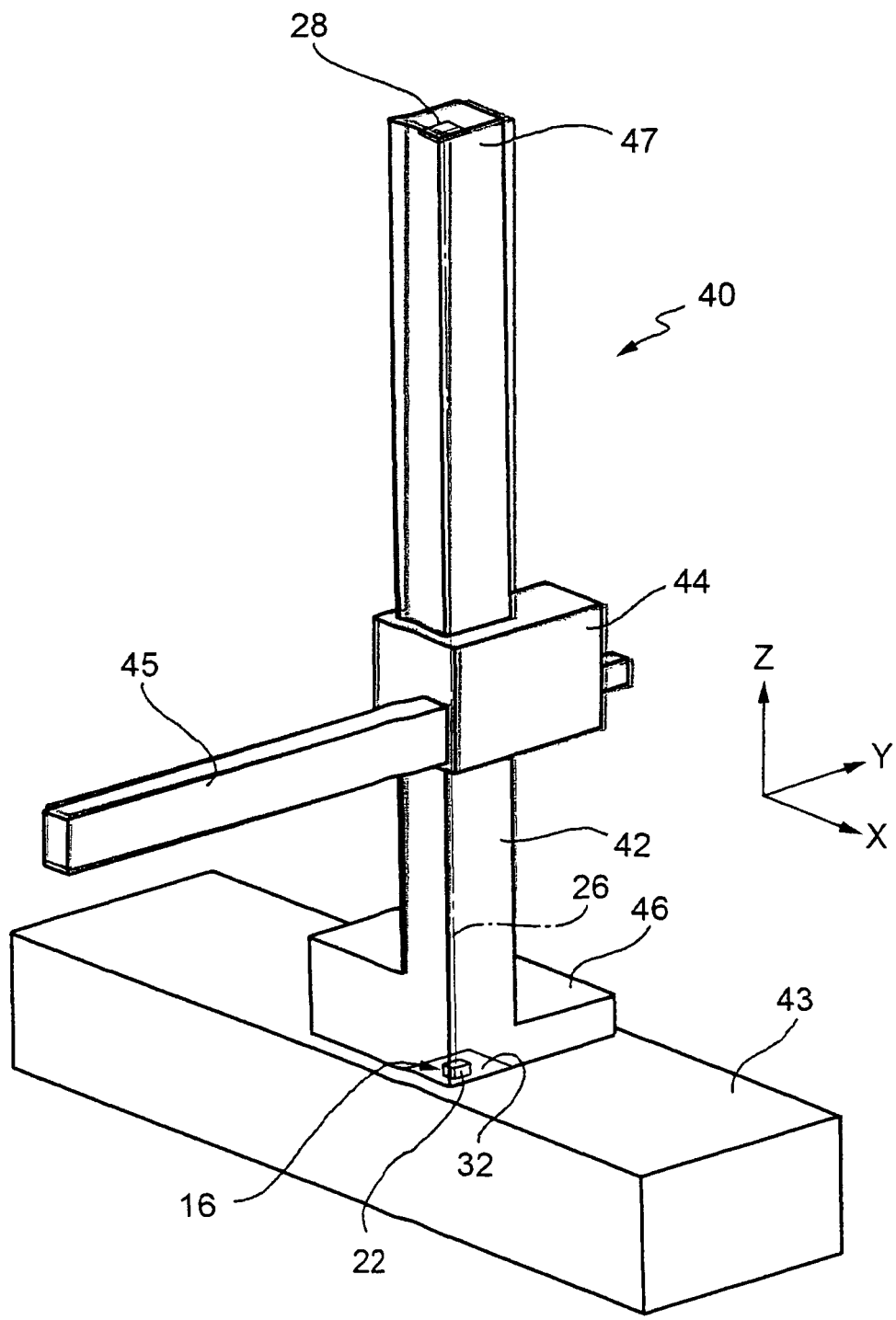
FIG. 10 is a schematic perspective view of a horizontal arm measuring machine manufactured according to the present invention.
Figure 11:
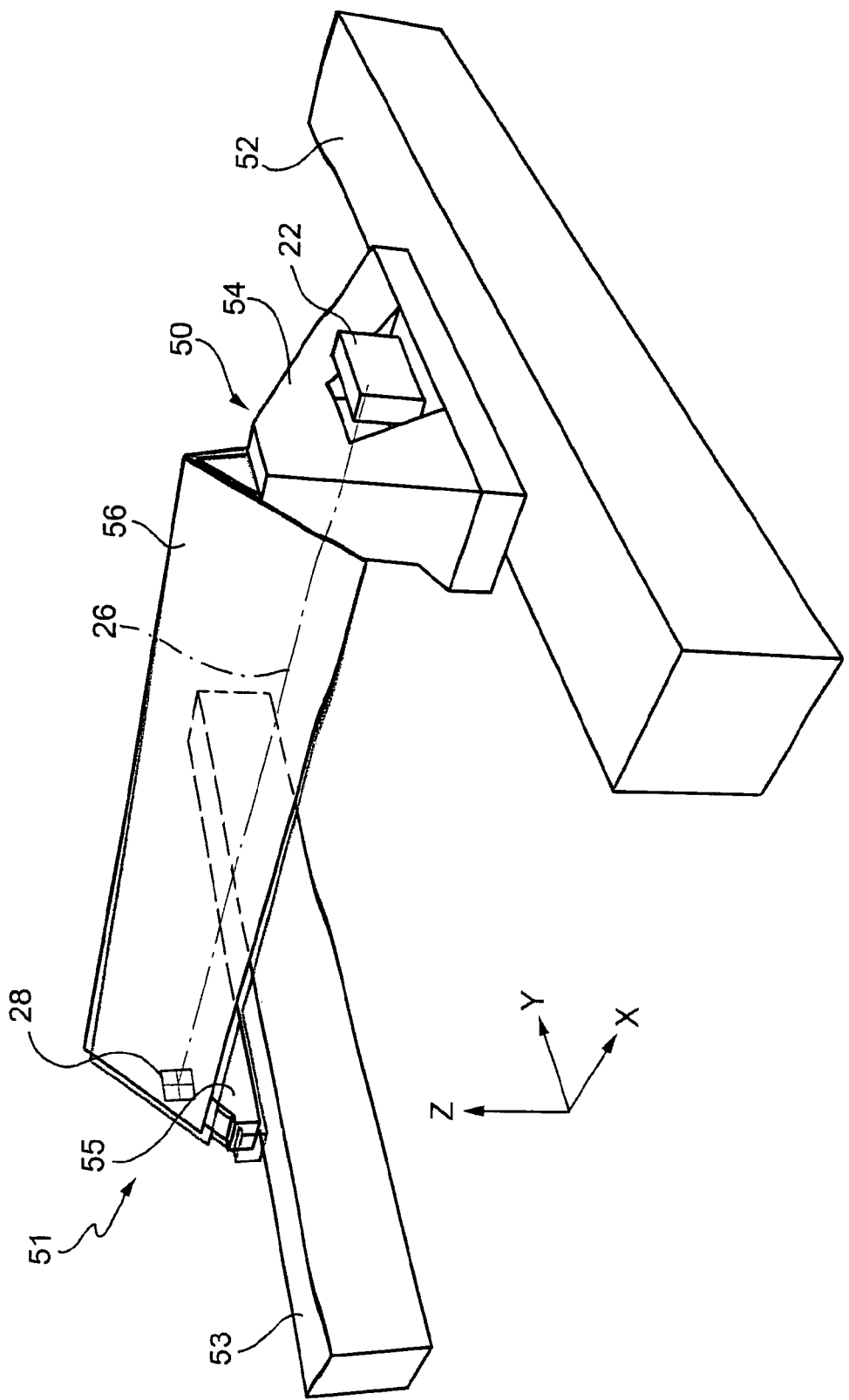
FIG. 11 is a schematic and partial perspective view of a gantry machine manufactured according to the present invention.

FIGS. 10 and 11 illustrate similar solutions applied to other types of machine.

For example, FIG. 10 illustrates a horizontal arm machine 40 comprising: a vertical column 42, which is mobile on a bed 43 along a first axis X; a mobile carriage 44, which is carried by the column 42 and is mobile along a second vertical axis Z; and a horizontal arm 45, which is carried by the carriage 44 and is longitudinally mobile along a third horizontal axis Y.

In this case, the laser sensor 16 has the emitter 22 set on a rigid support 32 fixed with respect to a foot 46 of the column, and the PSD 28 set in the proximity of a top free end of the column itself. Any bending of the column in the directions X and Y is thus detected.

A similar system could be installed also in the horizontal arm for detection of any bending of the arm itself in the directions X and Z.

FIG. 11 illustrates the carriage 50 of a gantry machine 51. The carriage 50 is mobile along an axis Y on a pair of guides 52, 53 supported by pillars (not illustrated).

The carriage 50 is constituted by a motor-driven slide 54 mobile along the guide 52, a supporting slide 55 mobile along the guide 53, and a beam 56 transverse to the guides 52, 53, which has the ends fixed respectively to the slides 52, 53. The beam 56 defines guides (not illustrated) for sliding in the direction X of a further carriage (not illustrated either), designed to carry a column that is mobile in a vertical direction (Z).

The laser sensor comprises in this case an emitter 22, fixed with respect to the slide 54, and a PSD 28, fixed with respect to the slide 55. This configuration is suitable for detection of any bending of the beam 56 in the direction Y.

From an examination of the characteristics of the machines 1, 30, 40 and 51 the advantages enabled by the present invention are evident.

In particular, the use of laser sensors 16 makes it possible to detect in a simple and inexpensive way the measurable quantities correlated with the deformations of the mobile parts of the machine resulting from the dynamic effect.

Said quantities can be used in real time for calculating and compensating for the measurement errors caused by the structural deformations of the machine by using appropriate mathematical methods.

In particular, it is possible to define an input-output model of the machine that is more or less complex, according to the type of machine and to the greater or smaller incidence of certain components of the error, the inputs (that can be measured) being the supply currents of the motors and the outputs being measurable quantities (in particular, the ones supplied by the laser sensor) and non-measurable quantities (the measurement errors). It is consequently possible to define an estimator filter, which supplies, in response to the input quantities and to the output measurable quantities, the estimated values of the non-measurable quantities.

Finally, it is clear that modifications and variations can be made to the machines and to the method described, without thereby departing from the scope of protection defined by the claims.

The invention claimed is:

1. A measuring machine comprising:
a mobile unit to move a measurement sensor in a measurement volume, the mobile unit comprising a first mobile member movable along a first axis, a second mobile member movable along a second axis with respect to said first mobile member and a third mobile member movable along a third axis with respect to said second mobile member, said mobile members being movable under the thrust of driving means and at least one of said mobile members being subjected to dynamic deformations;
a laser sensor provided with a laser emitter directly fixed to a first portion of said at least one of said mobile members and a target directly fixed to a second portion of said at least one of said mobile members and designed to receive a laser beam generated by the emitter; and
means for compensating for measurement errors of the machine resulting from the dynamic deformations of said at least one of said mobile members and in response to displacement of a point of incidence of the laser beam on the target with respect to a reference position in undeformed conditions, the displacement of the point resulting from a relative displacement of the first and second portions of said at least one of said mobile members due to the dynamic deformations.

2. The machine of claim 1, wherein the target is a position sensitive device (PSD).

3. The machine of claim 1, wherein the mobile member comprises a beam element, the emitter and the target being set at opposite ends of the beam element.

4. The machine of claim 1, wherein said at least one of said mobile members comprises at least one first element having a first end and a second end, and a second element having a first end and a second end, the first and second elements being connected to one another in an area corresponding to the respective first ends, the first and second elements being hollow, the emitter being arranged in the first end of the second element and being fixed to a rigid support, which is fixed with respect to the second end of the first element, the target being fixed to the second end of the second element.

5. The machine of claim 1, wherein the laser sensor is housed inside said at least one of said mobile members, the laser beam extending through a cavity of said at least one of said mobile members.

6. The machine of claim 4, wherein said at least one of said mobile members is a carriage, which is mobile on a bed and has a bridge structure provided with two uprights and a cross member, a first upright of the carriage comprising a motor-driven slide, which is slidable on the bed.

7. The machine of claim 6, wherein the first element is constituted by the first upright and the second element is constituted by the cross member; the rigid support being constituted by a bar extending inside the first upright and having a bottom end fixed to the slide of the first upright, and a top end extending inside the cross member at a first end thereof, the emitter being fixed on the top end of the bar, the target being set inside the cross member, at one opposite end thereof.

8. The machine of claim 6, wherein the first element is the cross member and the second element is the second upright, the rigid support being constituted by a bar extending inside a longitudinal cavity of the cross member and having one end fixed to the first upright, the emitter being fixed to an opposite end of the bar, and the target being housed in a foot of the second upright.

9. A method to compensate for measurement errors due to dynamic deformations of a measuring machine provided with a mobile unit, the mobile unit to move a measurement sensor in a measurement volume, the mobile unit comprising a first mobile member movable along a first axis, a second mobile member movable along a second axis with respect to said first mobile member and a third mobile member movable along a third axis with respect to said second mobile member, said mobile members being movable under the thrust of driving means and at least one of said mobile members being subjected to dynamic deformations due to motion of the mobile unit, the method comprising:
generating a laser beam via an emitter directly fixed to a first portion of said at least one of said mobile members of the mobile unit;
detecting displacement of a point of incidence of the laser beam on a target directly fixed to a second portion of said at least one of said mobile members, the displacement relative to a reference position corresponding to an undeformed condition of said at least one of said mobile members, the displacement due to the dynamic deformations; and compensating for the measurement errors of the measuring machine as a function at least of the displacement.

10. The method of claim 9, wherein detection of the displacement of the point of incidence of the laser beam is performed via a PSD defining the target.

11. The method of claim 9, wherein compensation of the measurement errors is performed by means of an estimator filter supplying an estimate of the measurement error in response to measured values of input quantities and of measured values of a subset of output quantities comprising the displacement of the point of incidence of the laser beam.

12. A measuring machine comprising:
- a mobile unit to move a measurement sensor in a measurement volume, the mobile unit comprising at least one member mobile along an axis under the thrust of driving means and being subjected to dynamic deformations;
- a laser sensor provided with a laser emitter fixed to a first portion of the mobile member and a target fixed to a second portion of the mobile member and designed to receive a laser beam generated by the emitter, the laser sensor housed inside the mobile member, the laser beam extending through a cavity of the mobile member; and
- means for compensating for measurement errors of the machine resulting from the dynamic deformations of the mobile unit and in response to displacement of a point of incidence of the laser beam on the target with respect to a reference position in un-deformed conditions, the displacement of the point resulting from the relative displacement of the first and second portions of the mobile member.

* * * * *